US008053542B2

(12) United States Patent
Hamann et al.

(10) Patent No.: US 8,053,542 B2
(45) Date of Patent: Nov. 8, 2011

(54) STYRENE-BUTADIENE POLYMERS WITH STYRENE GRADIENT AND METHODS OF MAKING THE SAME

(75) Inventors: Evemarie Hamann, Halle (DE); Hagen Bartossek, Schkopau (DE)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 12/989,864

(22) PCT Filed: Apr. 23, 2009

(86) PCT No.: PCT/US2009/041483
§ 371 (c)(1),
(2), (4) Date: Oct. 27, 2010

(87) PCT Pub. No.: WO2009/134665
PCT Pub. Date: Nov. 5, 2009

(65) Prior Publication Data
US 2011/0178256 A1    Jul. 21, 2011

Related U.S. Application Data

(60) Provisional application No. 61/049,171, filed on Apr. 30, 2008.

(51) Int. Cl.
C08F 236/10 (2006.01)
C08F 2/06 (2006.01)
C08F 8/24 (2006.01)
C08L 9/06 (2006.01)

(52) U.S. Cl. ......... 526/340; 526/79; 526/87; 525/332.2; 525/332.9; 524/575

(58) Field of Classification Search ............. 526/79, 526/87, 340; 525/332.3, 332.9; 524/575
See application file for complete search history.

(56) References Cited

U.S. PATENT DOCUMENTS

| 3,094,512 | A | 6/1963 | Short et al. |
| 4,519,431 | A | 5/1985 | Yoshimura et al. |
| 4,547,560 | A | 10/1985 | Hattori et al. |
| 4,845,154 | A | 7/1989 | Blythe et al. |
| 4,948,849 | A | 8/1990 | Blythe et al. |
| 5,241,008 | A | 8/1993 | Hall |
| 5,395,902 | A | 3/1995 | Hall |
| 6,372,863 | B1 | 4/2002 | Kerns et al. |
| 6,521,733 | B1 * | 2/2003 | Karato ................... 526/340 |
| 6,903,155 | B2 | 6/2005 | Hodge |
| 2003/0096891 | A1 | 5/2003 | Sethuraman et al. |
| 2005/0171290 | A1 | 8/2005 | Bening et al. |
| 2008/0051510 | A1 | 2/2008 | Toney et al. |

FOREIGN PATENT DOCUMENTS

| EP | 0 648 790 B1 | 6/1998 |
| GB | 994726 | 7/1963 |
| GB | 1387920 | 9/1972 |

OTHER PUBLICATIONS

PCT Search Report mailed Aug. 30, 2010 for corresponding PCT Application No. PCT/US2009/041483.

* cited by examiner

*Primary Examiner* — Fred M Teskin (74) *Attorney, Agent, or Firm* — Brinks Hofer Gilson & Lione (57) ABSTRACT

The invention provides a process for polymerizing a polymer comprising monomeric units derived from styrene and 1,3-butadiene, said process comprising: A) adding less than 60 weight percent of the total amount of the butadiene used in the polymerization, to a reactor comprising the total amount of styrene used in the polymerization and solvent; B) adding at least one initiator to the reactor, and allowing the reaction to proceed for a time t; C) adding the remaining amount of butadiene to the reactor in two or more separate additions; and wherein for each butadiene addition, the amount of subsequent butadiene added is less than, or equal to, the amount of butadiene added in the immediately prior addition; and wherein for each butadiene addition, the butadiene is added over a time, $t_{nc}$, and after each addition, the reaction is allowed to proceed for a time, $t_{nr}$, wherein n is the number of the butadiene addition, and for each addition, n is independently greater than, or equal to, 1.

18 Claims, 1 Drawing Sheet

STYRENE-BUTADIENE POLYMERS WITH STYRENE GRADIENT AND METHODS OF MAKING THE SAME

This application is a National Stage of International Application PCT/US2009/041483 filed Apr. 23, 2009, which claims the benefit of the filing date under 35 U.S.C. §119(e) of Provisional U.S. Patent Application Ser. No. 61/049,171, filed Apr. 30, 2008. The entirety of both application is hereby incorporated by reference.

FIELD OF THE INVENTION

High styrene rubber (SSBR) with a special structure, as been discovered, as well as the process to produce this rubber. This special structure is characterized by a special styrene gradient over the polymer chain, comprising a lower styrene content on both chain ends and a higher styrene content towards the middle of the polymer chain.

BACKGROUND OF THE INVENTION

GB Patent Specification 994726 discloses a linear copolymer, derived from the following: (A) at least one diene consisting of 1,3-butadiene or isoprene, and (B) at least one vinyl-substituted aromatic compound. The diene and aromatic compound are randomly distributed in the copolymer, and the diene content of the copolymer is characterized by (1) a cis-1,4 structure of at least 30 percent, and a 1,2 structure not in excess of 12 percent, and where the diene is butadiene or piperylene, or (2) a cis-1,4 structure of at least 70 percent, and a 3,4 structure not in excess of 15 percent, and substantially no 1,2 content, and where the diene is isoprene. An elastomeric copolymer is made by a copolymerization process using a lithium-based catalyst, and should comprise from 10 to 40 weight percent of polymerized vinyl-substituted aromatic compound. During the copolymerization reaction, the monomer ratio is maintained constant by incremental additions of the faster polymerizing diene 25 monomer. The copolymer may be telomerized by the slower polymerizing monomer by continuing the polymerization after the last incremental addition of the faster polymerizing monomer.

European Patent EP 0530795B1 discloses a process for preparing continuously tapered polymers and copolymers having a continuous change in 30 microstructure along the polymer backbone. The process produces polymers and copolymers with multiple glass transition temperatures of very small energy absorption, that is, no definable glass transition temperature. The polymers are disclosed as having a flexible chain end, and as becoming progressively stiffer along the length of the chain.

European Patent EP 0530796B1 discloses a process for the dispersion copolymerization of 35 to 70 percent, by weight, of vinyl substituted aromatic monomer, and 30 to 65 percent, by weight, of conjugated diene monomer. The process comprises carrying out the copolymerization in a reaction mixture containing a liquid aliphatic linear hydrocarbon dispersing medium, an anionic catalyst system, and a block copolymer dispersing agent, comprising at least two polymer blocks. At least one of the polymer blocks is soluble in the dispersing medium, and at least one other of the polymer blocks is insoluble in the dispersing medium. The dispersing agent is disclosed as acting to disperse the random copolymer of vinyl substituted aromatics and conjugated dienes, which is formed in the presence of the dispersing agent.

European Patent EP 0648790B1 discloses a continuous polymerization process for the preparation of a rubbery copolymer, by the non-aqueous dispersion, random polymerization of a mixture of 30 to 65 percent, by weight, of a conjugated diolefin monomer, preferably butadiene, and 35 to 70 percent, by weight, of a vinyl substituted aromatic monomer, preferably styrene. The polymerization takes place in a liquid aliphatic hydrocarbon dispersion medium, with an anionic initiator catalyst system, in the presence of a block copolymeric dispersing agent, which is continuously prepared in-situ. At least one block of the dispersing agent is continuously prepared prior to the dispersion polymerization reaction, and a second block of the dispersing agent and a rubbery copolymer are continuously prepared in-situ during the dispersion copolymerization. The second block of the dispersing agent is disclosed as having the polymer structure of the continuously produced rubber copolymer.

U.S. Pat. No. 6,903,155 B2 discloses tires suitable for bearing heavy loads, and to the use of a rubber composition to form the treads of such tires. The rubber composition comprises the following: an elastomeric matrix comprising a majority of at least one diene elastomer having, at one or more of its chain ends, a functional group, which is active for coupling to a reinforcing white filler; a reinforcing filler comprising at least 50 percent, by weight, a reinforcing white filler; and a reinforcing white filler/functionalized diene elastomer bonding agent.

U.S. Pat. No. 3,094,512 discloses a process for preparing random copolymers of conjugated dienes and vinyl-substituted aromatic compounds; a process for preparing 1,3-butadiene/styrene random copolymers; and a process for preparing isoprene/styrene copolymers. This patent discloses a process for producing such polymers using an organolithium catalyst. The process comprises charging to a polymerization zone, containing a catalyst of the formula $R(Li)_x$ (R is a hydrocarbon radical selected from the group consisting of aliphatic, cycloaliphatic, and aromatic radicals) and a hydrocarbon diluent, a conjugated diene of 4 to 5 carbon atoms, and, simultaneously, a vinyl-substituted aromatic hydrocarbon in which the vinyl group is attached to a nuclear carbon atom. The monomers are charged at a rate less than the normal polymerization rate of the system, under the conditions employed.

UK Patent Application GB 2110695A discloses styrene-butadiene copolymers having a high styrene content, and obtained by polymerizing styrene and butadiene in a hydrocarbon solvent, in the presence of an organolithium compound, and, if necessary, a Lewis base, and then coupling the resulting polymer with a tin halide 15 compound. The copolymer contains, in its main chain, at least 30 percent, by weight, of polymer having tin-carbon bonds, and has a bound styrene content of more than 25 percent, by weight, but not more than 60 percent, by weight, and a content of vinyl bonds, in the butadiene portion, of not less than 30 percent, but less than 50 percent.

GB Patent Specification 903,331 discloses a random copolymer containing not more than 2 percent, by weight, of a block copolymer, and which is prepared by charging a conjugated diene, and a vinyl substituted aromatic hydrocarbon to a polymerization zone, containing a hydrocarbon diluent and a catalyst $RLi_x$ (where x is 1 to 4 and R is an aliphatic, cycloaliphatic or aromatic radical). The monomers are charged at a rate less than the normal polymerization rate, under the conditions employed. The monomers are added at $\frac{1}{10}$ to $\frac{1}{300}$ of the total charge per minute (that is, in from 10 minutes to 5 hours). The products have a structure which is 5-20 percent vinyl, 30-95 percent cis, and 0-60 percent trans, and they may be rubbery or liquid.

U.S. Pat. No. 6,372,863B1 discloses a process for synthesizing random styrene 30 butadiene rubber comprising the following: (1) continuously charging 1,3-butadiene, styrene, an initiator, and a solvent into a first polymerization zone, (2) allowing the 1,3-butadiene and styrene to copolymerize, in the first polymerization zone, to total conversion of 60 to 90 percent, to produce a polymer cement containing living styrene-butadiene chains, (3) continuously charging the polymer cement and additional 1,3-butadiene monomer into a second polymerization zone, wherein from 20 to 40 percent of the total amount of 1,3-butadiene changed, is charged into the second polymerization zone, (4) allowing the copolymerization to continue in the second polymerization zone, to a conversion of the 1,3-butadiene monomer of at least 90 percent, wherein the total conversion of styrene and 1,3-butadiene in the second polymerization zone is limited to a maximum of 95 percent, (5) withdrawing a polymer cement of random styrene-butadiene rubber having living chain ends from the second reaction zone, (6) killing the living chain ends on the random styrene-butadiene rubber, and (7) recovering the random styrene-butadiene rubber from the polymer cement. The copolymerizations in the first polymerization zone and the second polymerization zone are carried out at a temperature in the range of 70° C. to 100° C., and the amount of styrene charged into the first polymerization zone is at least 5 percent more than the total amount of styrene bound into the rubber.

U.S. Pat. No. 4,845,154 discloses copolymers of aromatic vinyl compounds (for example, styrene) and conjugated diolefins (for example, butadiene), and which possess a differential content of the aromatic vinyl compound, such that, in at least one of the end portions of the copolymer, the differential content shows a sharp and substantial increase in the direction of the outer extremity of the end portion. Preferred copolymers are styrene-butadiene copolymers having a vinyl content of at least 30 percent. In some embodiments, the copolymers have a styrene content changing in a portion of no more than 5 percent of the copolymer chain, from a first value to a second value, and where the second value is at least 25 percentage points 25 greater than the first value, and the portion is present within a 10 percent terminal portion of the copolymer.

GB Patent Specification 1387920 discloses copolymers prepared by simultaneously passing a mixture of styrene and butadiene to a reaction zone, the polymerization being carried out in the presence of a polymeric organodilithium compound (for example, polybutadiene dilithium), suitably in an organic medium. During the reaction, the monomer mixture is added to the polymerization vessel at a rate at least as great as the rate of polymerization, and preferably 5-10 percent greater. The less reactive monomer, styrene, therefore builds up in the reaction mixture, so that it forms an increasing proportion of the polymer towards the chain ends, and forms terminal homopolymer blocks, after cessation of the addition of monomers, and reaction of all the butadiene.

There is a need for new rubber formulations that have an excellent wet grip/rolling resistance/wear and tear properties. There is a further need for new rubbers that can be economically produced, without the need of costly modifiers.

SUMMARY OF THE INVENTION

The invention provides a process for preparing a polymer comprising monomeric units derived from styrene and 1,3-butadiene, said process comprising:

A) adding less than 60 weight percent of the total amount of the butadiene used in the polymerization to a reactor comprising the total amount of styrene used in the polymerization, and solvent;

B) adding at least one initiator to the reactor, and allowing the reaction to proceed for a time t;

C) adding the remaining amount of butadiene to the reactor in two or more separate additions; and wherein for each butadiene addition, the amount of subsequent butadiene added, 20 is less than, or equal to, the amount of butadiene added in the immediately prior addition; and wherein for each butadiene addition, the butadiene is added over a time, $t_{nc}$, and after each addition, the reaction is allowed to proceed for a time, $t_{nr}$, wherein n is the number of the butadiene addition and for each addition, n is independently greater than, or equal to, 1.

The invention also provides a composition comprising a polymer, which polymer comprises monomeric units derived from styrene and 1,3-butadiene, and comprises uncoupled polymer chains, and wherein each uncoupled polymer chain has a styrene content that is higher in the middle region of the polymer chain and lower at the end regions of the polymer chain, and wherein the difference in styrene content in the middle region of the polymer chain and at both end regions of the polymer chain is greater than 1 mole percent, preferably greater than 5 mole percent, and more preferably greater than 10 mole percent, based on the total moles of polymerized styrene in the polymer chain.

DETAILED DESCRIPTION

As discussed above, the invention provides a process for preparing a polymer comprising monomeric units derived from styrene and 1,3-butadiene, said process comprising:

A) adding less than 60 weight percent of the total amount of the butadiene used in the polymerization to a rector comprising the total amount of styrene used in the polymerization, and solvent;

B) adding at least one initiator to the reactor, and allowing the reaction to proceed for a time t;

C) adding the remaining amount of butadiene to the reactor in two or more separate additions; and wherein for each butadiene addition, the amount of subsequent butadiene added is less than, or equal to, the amount of butadiene added in the immediately prior addition; and wherein for each butadiene addition, the butadiene is added over a time, $t_{nc}$, and after each addition, the reaction is allowed to proceed for a time, $t_{nr}$, wherein n is the number of the butadiene addition, and for each addition, n is independently greater than, or equal to, 1. Here, n will increase in consecutive order for each subsequent butadiene addition.

In one embodiment, in Step B, the time, t, ranges from 1 minute to 30 minutes In one embodiment, $t_{nc}$, for each addition, independently ranges from 1 minute to 45 minutes.

In one embodiment, $t_{nr}$, for each addition, independently ranges from 0 to 45 minutes.

In one embodiment, the total amount of solvent used in the polymerization is added to the reactor in step A).

In one embodiment, in step A), less than 50 weight percent of the total butadiene is added to the reactor.

In one embodiment, in step A), from 0.01 to less than 60 weight percent, preferably from 0.5 to less than 50 weight percent of the total butadiene is added to the reactor.

In one embodiment, in step C), the remaining amount of the butadiene is added in three separate additions.

In one embodiment, in step C), the remaining amount of the butadiene is added in four separate additions.

In one embodiment, in step C), the remaining amount of the butadiene is added in five separate additions.

In one embodiment, in step C), the remaining amount of the butadiene is added in seven separate additions.

In one embodiment the polymerization temperature is from 0° C. to 130° C., preferably from 20° C. to 110° C. The polymerization temperature can be determined from an electrode (for example, an SPEC electrode) placed in the polymerization solution.

In one embodiment, each tnc independently ranges from 3 minutes to 35 minutes.

In one embodiment, the process does not use a vinyl agent.

In another embodiment, a vinyl agent is added to the process. In a further embodiment, the vinyl agent is added in step A, before the addition of butadiene.

In one embodiment, a vinyl agent is used, selected from the group consisting 30 of tetrahydrofuran, glycols, and amines. In a further embodiment, the vinyl agent is tetramethylethylene diamine (TMEDA). In a further embodiment, the TMEDA to initiator molar ratio is from 0.05 mole/mole to 10 mole/mole, preferably from 0.05 mole/mole to 3 mole/mole.

In one embodiment, $t_{(n-1)r}$ is greater than one minute, and n is greater than, or equal to, 2, and wherein during the time $t_{(n-1)r}$, a coupling agent is added to the reactor.

In one embodiment, the coupling agent is selected from the group consisting of tin tetrachloride, silicon tetrachloride and silicon alkoxide, for example, silicon methoxide.

In one embodiment, the coupling rate is from 10 to 49 percent, preferably from 15 to 35 percent, based on the mass of final polymer in weight percent, and determined from the area of the SEC peaks of the coupled polymer relative to the total area using RI detection.

In one embodiment, $t'''$ is greater than one minute, and n is greater than, or equal to, 3, and wherein during the time $t_{nr}$, a modifying agent is added to the reactor.

In one embodiment, the modifying agent (or modifier) is selected from the group consisting of amines, amides, thioglycols, silicon alkoxides (for example, silicon methoxide), silane-sulfide modifiers.

In one embodiment, the modifying agent comprises an amide.

In one embodiment, the modifier to initiator molar ratio is from 0.05 mole/mole to 3 mole/mole, preferably from 0.3 mole/mole to 1.5 mole/mole.

An inventive process may comprise a combination of two or more embodiments as described herein.

The invention also provides a polymer formed from an inventive process, and for compositions comprising the same.

In one embodiment, the polymer has a polymerized styrene content from 42 to 62 weight percent, preferably from 44 to 60 weight percent, based on the total weight of polymerized monomers, as determined by 1H NMR.

In one embodiment, the polymer has a polymerized styrene content from 45 to 62 weight percent, preferably from 47 to 60 weight percent, based on the total weight of polymerized monomers, as determined by 1H NMR.

In one embodiment, the polymer has a polymerized butadiene content from 38 to 58 weight percent, preferably from 40 to 56 weight percent, based on the total weight of polymerized monomers, as determined by 1H NMR.

In one embodiment, the polymer has a polymerized 1,2-butadiene content from 3 to 50 weight percent, preferably from 5 to 35 weight percent, based on the total moles of polymerized butadiene, as determined by 1H NMR.

In one embodiment, the polymer has a Mooney Viscosity (ML 1+4 at 100° C.) from 20 to 150, preferably from 40 to 120.

In one embodiment, the polymer has a glass transition temperature ($T_g$) from 100° C. to −45° C., preferably from −5° C. to −45° C.

The invention also provides a composition comprising a polymer, which polymer comprises monomeric units derived from styrene and 1,3-butadiene, and comprises uncoupled polymer chains, and wherein each uncoupled polymer chain has a styrene content that is higher in the middle region of the polymer chain and lower at the end regions of the polymer chain, and wherein the difference in styrene content in the middle region of the polymer chain and at both end regions of the polymer chain is greater than 1 mole percent, preferably greater than 5 mole percent, and more preferably greater than 10 mole percent, based on the total moles of polymerized styrene in the polymer chain. Here, the styrene content is determined by 1H NMR.

Here, the middle region of the polymer chain is from 5 percent to 95 percent, preferably from 20 percent to 70 percent, and more preferably from 40 percent to 60 percent of the polymer chain, based on the molecular weight of the polymer chain. For example, for a middle region from 5 to 95 percent, if the molecular weight, M, of the polymer chain is 300 kg/mol, then the alpha chain end is 0-15 kg/mol, the middle region is 15-285 kg/mol, and the omega chain end is 285-300 kg/mol. The alpha chain end and the omega chain end represent the end regions of the chain.

In one embodiment, from 10 to 49 percent, preferably from 15 to 35 percent (based on the mass of final polymer in weight percent) of the polymer is coupled, and determined from the area of the SEC peaks of the coupled polymer relative to the total area, using RI detection.

In one embodiment, the polymer is modified with a modifying agent (or modifier), selected from the group consisting of amines, amides, thioglycols, silicon alkoxides, and silane-sulfide modifiers.

In one embodiment, the polymer has a polymerized styrene content from 42 to 62 weight percent, preferably from 44 to 60 weight percent, based on the total weight of polymerized monomers. This content can be determined by 1H NMR.

In one embodiment, the polymer has a polymerized butadiene content from 38 to 58 weight percent, preferably from 40 to 56 weight percent, based on the total weight of polymerized monomers.

In one embodiment, the polymer has a polymerized 1,2-butadiene content from 3 to 50 weight percent, preferably from 5 to 35 weight percent, based on the total weight of polymerized butadiene.

In one embodiment, the polymer has a Mooney Viscosity (ML 1+4 at 100° C.) from 20 to 150, preferably from 40 to 120.

In one embodiment, the polymer has a glass transition temperature ($T_g$) from 0° C. to −45° C., preferably from −5° C. to −45° C.

An inventive composition may comprise a combination of two or more embodiments as described herein.

An inventive polymer may comprise a combination of two or more embodiments as described herein.

The invention also provides an article comprising at least one component formed from an inventive composition.

In one embodiment, the article is a tire.

In one embodiment, the article is a shoe component.

An inventive article may comprise a combination of two or more embodiments as described herein.

The inventive polymer is a high styrene rubber (SSBR) with a special structure. This special structure is characterized by a special styrene gradient over the polymer chain, comprising a lower styrene content on both chain ends, and an increasing styrene content towards the middle of the polymer chain. It is not necessary that the highest styrene concentration is really in the centre of the polymer chain or that the increase of the styrene content is symmetrically at both chain ends.

Lower styrene content of the SSBR at the chain ends, and higher styrene content within the polymer chain, are achieved by charging to a reactor the total amount of styrene together with solvent, and preferably the total amount of solvent, and perhaps a vinyl modifier, and only a part of the required butadiene. The reaction is initiated by a charge of, for example, butyl lithium, according to the target molecular weight. The remaining butadiene is then charged to the reactor in at least two additions, differing in the butadiene amount, feeding rate and/or reaction time.

In a preferred embodiment, this special polymer structure is achieved by an inventive polymerization process, which comprises the charge of the total amount of solvent, the total amount of styrene, and only a part of the total butadiene monomer, comprising less then 60 percent of the total butadiene amount added to the polymerization reaction. Vinyl agents (for example, THF, glycols, amines) may be used to adjust the vinyl level (from the diene), and are typically charged to the initial polymerization mixture (step A). The polymerization is started in a typical manner with the addition of an anionic initiator (for example, n-butyl lithium or s-butyl lithium). The remaining butadiene is charged after a certain time in several addition steps (not less then 2). To obtain the styrene gradient distribution along the polymer chain, each addition differs in one or more of the following: the amount of butadiene charged to the reactor (less than or equal to amount of butadiene in prior addition), the butadiene feed rate, and/or the following reaction time.

The weight ratio of the butadiene which is charged in the initial or start mixture depends on the amount of vinyl agent, if any. Some vinyl agents also react as styrene randomizers (for example, THF, TMEDA). For polymerizations that do not use a vinyl agent, only a very small portion of the butadiene is added to the initial mixture (0.1 to 35 weight percent of the total butadiene). The polymerization rate of butadiene is about ten times faster then the polymerization rate of styrene, without use of any vinyl agent. Thus, the bound styrene at the beginning of the polymerization is typically in a range from 10 to 40 weight percent, based on the total mass of the polymer at this stage of the polymerization. The amount of bound styrene depends on the styrene to monomer (styrene and butadiene) ratio present in the start mixture (step A), the polymerization temperature, and the vinyl agent to initiator ratio. Without any additional charge of butadiene, the reaction mixture is depleted of butadiene, and because of the higher styrene content in the reaction mixture, the incorporation of styrene increases. The first addition of butadiene begins before the styrene incorporates as blocks, as determined by 1H NMR on quenched polymer samples from the reaction, or by Gas Chromatography analysis (unreacted butadiene) on the reaction mixture, or by FTIR or NIR on the reaction mixture (unreacted butadiene). The free unreacted butadiene has to be monitored by one of these techniques, or other techniques as known in the art.

With increasing amount of vinyl agent, the butadiene charge in the initial mixture typically has to be increased up to 40 to 60 weight percent of the total used butadiene; for example, when TMEDA is used as a vinyl agent. However, typically the amount of the butadiene in the initial charge is less than 60 percent of the total amount of butadiene used in the polymerization.

The start time of the addition of butadiene charged to the initial reaction mixture (styrene, butadiene, vinyl agent, initiator) in the first addition (step C) depends on the following: (a) monomer ratio in the starting reaction mixture, (b) the vinyl agent/initiator ratio, if any vinyl agent is used, and (c) the applied temperature. Also, the higher the starting styrene/butadiene ratio in the initial reaction mixture, the earlier the first butadiene addition. The higher the vinyl agent-initiator ratio, the later the first butadiene addition. In the most cases, the first butadiene addition is added to the reaction at a temperature in the range from 55° C. to 80° C. The first butadiene addition typically begins from 5 to 20 minutes after the charge of the initiator.

Preferably, the first butadiene addition and sometimes the second butadiene addition are used to control the increasing styrene content in the polymer chain by decreasing the styrene content in the monomer mixture. The feed rates of butadiene in the first addition and sometimes the second addition are each decreased to obtain increasing styrene content in the polymer chain. The feeding rate of the last one to four butadiene additions are adjusted in such a way that the styrene content in the new formed part of the polymer chain is now decreasing towards the chain end. Thus, the charge rate of butadiene eventually becomes greater than, or equal to, the growth rate of the polymer chains, and the difference between the feeding rate of butadiene and the growth rate of the polymer chains has to increase very carefully during the polymerization. Because of the proceeding reaction and resulting depletion of monomer, the overall growth rate of the polymer chains decreases. At this stage of the polymerization, the addition of butadiene results in an excess of butadiene in the reaction mixture, and thus, it is possible to allow the polymerization to proceed for 5 to 15 minutes, after finishing the charge step, without significant increase in the bound styrene in the chain or formation of block styrene monomeric units within the polymer chain.

The feeding rate of the butadiene is typically adjusted at least two to five times in the described way to obtain the target styrene profile. The adjustment can be done by a continuous change of the feeding rate, or by switching to a new step of butadiene charging with a new defined feeding rate and amount. This step can be followed immediately to a butadiene charge step, but there can also be a certain time without charging of butadiene, before the next butadiene charge step.

The resulting living polymer can be chemically modified by chain end modification and/or coupling. The appropriate chain end modifier and/or coupling agent has to be chosen according to the target application and filler. Well known modifiers include, but are not limited to, sulfenyl halides (see EP1016674 incorporated herein by reference), benzophenone, isocyanate, hydroxyl mercaptans (see EP 0464478 incorporated herein by reference), acrylamide compounds (see EP0334042 incorporated herein by reference). Especially for use in carbon black compounds amines, amides, imides, nitriles modifiers (for example see EP548799, EP510410, U.S. Pat. No. 513,271, EP451604, EP180141, U.S. Pat. No. 4,412,041, each incorporated herein by reference). On the other hand special silanes, including, but not limited to, epoxy-containing silanes are used for modifying the polymer chain end for use in silica fillers (for example, see EP-A-299074, EP-A-102045, EP0447066, EP0692493, each incorporated herein by reference). Nevertheless, it is important to guarantee also during these steps, a certain butadiene level in the reaction system to decrease the styrene content at the end of the polymer chain. The coupling and/or chain end modification can be done as typically done, after finishing the polymerization at a total monomer conversion of more then 99.7 percent. The more preferred method is to couple the polymer and/or chain end modify the polymer during the reaction time of the last two addition steps. An uncoupled polymer chain has not been coupled to another polymer chain with a coupling agent.

Additives

In one embodiment, the polymer is combined, and reacted with, one or more fillers and a vulcanization agent, and, optionally, additional constituents, including, but not limited to, accelerators, coupling agents, and unmodified uncrosslinked elastomeric polymers (that is conventional uncrosslinked elastomeric polymers that have not been reacted with a modifier, but that have been prepared and terminated as is conventional in the art).

In one embodiment, the polymer formulation contains one or more fillers, which serve as reinforcement agents. Carbon black, silica, carbon-silica dual-phase filler, clay, calcium carbonate, magnesium carbonate, and the like, are examples. In one embodiment, the combination of carbon black and silica, the carbon-silica dual-phase-fillers, or the combination of carbon-silica dual-phase-filler and carbon black and/or silica are used. Carbon black is typically manufactured by a furnace method, and has a nitrogen adsorption specific surface area from 50 to 200 $m^2$/g, and a DBP oil absorption from 80 to 200 ml/100 grams; for example, FEF; HAF, ISAF, or SAF class carbon black. In one embodiment, high agglomeration type carbon black is used. In one embodiment, carbon black or silica is added in an amount from 2 to 100 parts by weight, and preferably from 5 to 100 parts by weight, more preferably from 10 to 100 parts by weight, and even more preferably from 10 to 95 parts by weight, for 100 parts by weight of the total elastomeric polymer. A polymer formulation may also contain an oil.

Definitions

Any numerical range recited herein, includes all values from the lower value and the upper value, in increments of one unit, provided that there is a separation of at least two units between any lower value and any higher value. As an example, if it is stated that a compositional, physical or other property, such as, for example, Molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values from the lowest value to the highest value enumerated, are to be considered to be expressly stated in this application. Numerical ranges have been recited, as discussed herein, in reference to Mooney viscosity, molecular weights and other properties.

The term "composition," as used herein, includes a mixture of materials, which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

Test Methods

Size Exclusion Chromatography to Determine the Percentage of Coupled Polymer Chains Molecular weight, molecular weight distribution and coupling rate (CR) of the polymer were each measured using Size Exclusion Chromatography (SEC), based on polystyrene standards. Each polymer sample (9-11 mg) was dissolved in 10 ml tetrahydrofuran to form a solution. The solution was filtered using a 0.45 µm filter. A 100 µl sample was fed into a GPC column (Hewlett Packard system 1100 with 3 PLgel 10 µm MIXED-B columns). Refraction Index—detection was used as the detector for analyzing the molecular weight. The molecular weight was calculated as polystyrene, based on the calibration with EasiCal PS1 (Easy A and B) Polystyrene Standards from Polymer Laboratories. Depending on the resolution of the columns, 2, 3 or 4 peaks can be detected. The peak with the largest area corresponds to the amount of uncoupled polymer. Two to four different peaks were obtained, depending on the resolution of the column. At high resolution, four peaks were obtained. The highest peak with the highest area represented the amount of uncoupled linear polymer. The molecular weight Mp (PS) means the molecular weight $M_{w,top}$ ($M_w$ at highest intensity (mass amount)), the value of $M_w$, with the highest mass amount of molecules, of this linear uncoupled polymer, calculated as polystyrene. The smaller peaks with higher molecular weights represented the coupled polymer. The coupling rate is calculated as the mass fraction of the sum of the area of all coupled peaks, corresponding to the coupled polymer, based on the total area of all peaks including the uncoupled polymer.

Gravimetric Analysis to Measure Monomer Conversion

Monomer conversion was determined via measurement of the solids concentration of the polymer solution during the polymerization. The maximum solid content is obtained at 100 wt % concentration by $TSC_{max}=(\Sigma m_{iBd}+\Sigma m_{iSt})/(\cdot(\Sigma m_{iBd}+\Sigma m_{iSt}+m_{TMEDA}+m_{NBL}+m_{Cyclohexan})*100\%$. A sample of polymer solution of about 1 g to 10 g, depending on the expected monomer conversion, was drawn from the reactor directly into a 200 ml Erlenmeyer flask filled with 50 ml ethanol. The weight of the filled Erlenmeyer flask was determined before as "A," and after sampling, as "B". The precipitated polymer was removed from the ethanol by filtration on a weighted paper filter (Micro-glass fiber paper, Ø90 mm, MUNKTELL, weight C), dried at 140° C., using a moisture analyzer HR73 (Mettler-Toledo), until a constant mass was achieved. The criterion 5 was used. Finally, a second drying period was applied, using switch off criteria 4, to obtain the final mass "D" of the dry sample on the paper filter. The polymer content in the sample was calculated as "TSC=(D−C)/(B−A)*100%." The monomer conversion was finally calculated as "TSC/TSCmax*100%."

Gravimetric Analysis to Measure Reduced Volatiles

A polymer sample of about 5 g was dried at 120° C., using a halogen moisture analyzer HR73 (Mettler-Toledo), until a value for the residual moisture was obtained which was below 0.5 wt %, based on total amount of polymer.

1H-NMR

Vinyl and styrene content was measured using 1H-NMR, following ISO 21561-2005, using a NMR spectrometer BRUKER Avance 200, and a 5 mm Dual probe. The CDCl$_3$/TMS was used as solvent, in a weight ratio of 0.05%/99.95%.

DSC (Tg)

The glass transition temperature, Tg, was measured and calculated as described in ISO 11357-2 (1999) for $T_{mg}$, with the exception that a heat rate of 10K/min was used. The following conditions were used.

Weight of sample: about 11 mg
Sample container: Standard aluminum pans
Temperature range: (−140 . . . 100)° C.
Heating rate: 10 K/min
Cooling rate: free cooling
Purge gas: 20 ml Ar/min
Cooling agent: liquid nitrogen
Evaluation method: half height
Device: DSC 2920 from TA-Instruments Mooney Viscosity ML1+4 (100° C.)

Mooney viscosity on polymer (no filler and no oil) was measured according to ASTM D 1646 (2004), with a preheating time of one minute, and a rotor operation time of four minutes, at a temperature of 100° C. [ML1+4(100° C.)] on a MV2000 E from Alpha-Technologies.

Tensile strength, elongation at break, modulus at 300% elongation (Modulus 300), and modulus at 100% elongation (Modulus 100) were each measured according to ASTM D 412-06, using dumbbell Die C, on a Zwick Z010 tensile machine (sample punched out from a 2 mm thick plate after curing to t95, 160° C., 160-220 bar, ambient atmosphere).

Heat build up was measured according to ASTM D 623-07, method A, on a Doli 'Goodrich'-Flexometer (curing specimen for t95+5 min; dimensions: height: 25.4 mm, diameter 17.8 mm, 160° C., 160-220 bar, ambient atmosphere].

Tan δ (60° C.) was measured using the dynamic spectrometer, Eplexor 150N manufactured by Gabo Qualimeter Testanlagen GmbH (Germany), by applying a compression dynamic strain of 0.2%, at a frequency of 2 Hz, at 60° C. The smaller the index, the lower is the rolling resistance (lower=better).

Tan δ (0° C.) was measured using the same equipment and load conditions, as discussed above, at 0° C. The larger the index, the better the wet skid resistance (higher=better).

For the Tan δ measurements, the unvulcanized polymer formulation was pressed into disks of 60 mm inner-diameter and 8 mm height. Pressing (about 200 bar pressure) the rubber compound into above metal disk removes air, thus avoiding inclusion of air bubbles, and leads to the formation of visually bubble free, homogeneous compound material. After completion of the vulcanization process (160° C., for t95+5 minutes (note: t95 is the time to achieve 95% vulcanization conversion, about 10 to 22 minutes, ambient atmosphere (air)), a homogeneous disk of 60 mm diameter and 8 mm height results. A specimen is drilled out of the aforementioned dish, and has a size of 10 mm diameter and 8 mm height.

Measurement of rheological properties on unvulcanized samples were made according to ASTM D 5289-07, using a rotor-less shear rheometer (MDR 2000 E) to measure Scorch Time (ts) and Time to Cure (tx). The "t50" and "t95" are the respective times required to achieve 50 percent and 95 percent conversion of the vulcanization reaction. The sample specimen was prepared according to ASTM D5289-07.

DIN abrasion was measured according to ASTM D 5963-04. The larger the index, the lower the wear resistance (lower=better). The specimen was prepared as described for Tan δ.

Tear strength was measured according to ASTM D624-00, using Die C which as punched out from a 2 mm plate after curing. Hardness Shore A was measured according to ASTM D 2240-05, using a 12.5 mm specimen of diameter 50 mm, on a ZWICK Hardness Tester Shore A.

Rebound resilience was measured according to ISO 4662-86, using a 12.5 mm specimen of diameter 50 mm, on a ZWICK 5109 Schob Pendulum type.

EXAMPLES

Polymerizations

The polymerizations were performed under exclusion of moisture and oxygen, in a nitrogen atmosphere.

Reagents

Cyclohexane (distilled) was used as a solvent. The 1,3-butadiene (distilled) and styrene (dried via CaH$_2$) were used as monomers. Tetramethylethylenediamine (TMEDA (Merck)) was diluted in cyclohexane, and used as a as randomizer, and as a vinyl promoter. Tin tetrachloride (Fluka) was also diluted in cyclohexane, and used as a coupling agent. Methanol (Merck) was used as a termination agent. The 2,6-ditert-butyl-4-methylphenol (B.H.T) was from Sunvit GmbH.

Example 1

TT17

Cyclohexane ($m_{CH,0}$=4980 g), butadiene ($m_{BD,0}$=245.51 g), styrene ($m_{St,0}$=510.92 g) and tetramethylethylene diamine (TMEDA (2.86 mmole resp $m_{TMEDA,0}$=13.6 g of the cyclohexane solution)) were charged to a ten liter reactor, under nitrogen atmosphere, and the mixture was heated up to 55° C., while stirring. Next, 4.704 mmole n-butyl lithium ($m_{NBL,T}$=12.69 g solution in cyclohexane) was charged, drop wise, to the mixture (to react with impurities), until the color of the reaction mixture changed to yellowish color (titration step). Next, 6.487 mmole n-butyl lithium (solution in cyclohexane: $m_{NBL,P}$=17.5 g), corresponding to the target molecular weight of the polymer, was charged immediately, via a pump, to initiate the polymerization. The start time of the charge of the "6.487 mmole of n-butyl lithium" was used as the start time of the initial polymerization reaction.

The initial polymerization step was characterized by a typical batch polymerization, without a charge of any additional reactants. The reaction temperature was adjusted using hot water circulation in the wall of the reactors, beginning after the charge of the "6.487 mmole n-butyl-lithium," to a final polymerization temperature, $T_{pm}$, of 85° C., at a rate of 1° C./min to accelerate the polymerization reaction, and shorten the reaction time.

After reacting the initial charge for 15 minutes, the first butadiene addition ($m_{BD,1}$, =168.83 g) began, using a feed rate of 11.26 g/min, for a charge time of 15 minutes. After this addition, no reaction time was allowed. The second butadiene addition ($m_{BD,2}$=86.81 g) began immediately after the first addition, using a feed rate of 5.79 g/min for 15 minutes. Upon completion of the second butadiene charge, the reaction was allowed to proceed for 5 minutes. Then the third butadiene addition ($m_{BD,3}$=5.15 g) began, with a feeding rate of 5.15 grams per minute. Upon completion of this addition, the reaction was allowed to proceed for a further 12 minutes. After this time, a fourth butadiene addition ($m_{BD,4}$=5.15 g) began, with a feed rate of 5.15 g/minutes. This addition was followed by a reaction time of 15 minutes.

During the reaction time, after the third butadiene, tin tetrachloride (0.423 mmole resp 5.24 g solution) was added to the reaction vessel to couple a portion of the polymer chains (about 25 percent of the polymerized chains, as determined by SEC). During the reaction time, after the fourth butadiene addition, n-methylpyrrolidone (2.38 g solution in cyclohexane, containing 5.65 mmole) was added to the reaction vessel for modification of the polymer chain ends. The modified polymer may be used in a carbon black filled compound.

The final polymer suspension was cooled to ambient temperature. Methanol was added at a molar ratio of "methanol/active initiator I*" of "2 mole/mole," under stirring, to terminate the reaction. Next, a solution of BHT (8.14 g containing 13 mmole BHT) in cyclohexane was distributed into the polymer suspension. The polymer was then recovered from the solution via steam stripping at 100° C. The polymer was milled to small crumbs, dried in an oven, with air circulation, at 70° C., for 30 minutes. Finally the polymer crumbs were dried under ambient conditions, under air, until the content of residual volatiles reached below 0.5 percent, as determined by gravimetric analysis at 120° C.

Example 2

TT18

Example 1 was repeated, with the following changes. TMEDA (5.179 mmole) was used in the initial charge.

Example 3

TT15

Example 1 was repeated, with the following change. The initial charge contained "4.59 mmole TMEDA" instead of 2.86 mmole TMEDA."

Example 4

TT23

Cyclohexane (4989 g), butadiene (154.02 g), styrene (512.02 g) and TMEDA (0.86 mmole) were charged to a ten liter reactor, under nitrogen atmosphere, and the mixture was stirred and heated to 55° C. Next, n-butyl lithium (3.23 mmole) was charged drop wise (to react with the impurities), until the color of the reaction mixture changed to a yellowish color (titration step). Next, n-butyl lithium (6.52 mmole), corresponding to the target molecular weight of the polymer, was charged immediately, via a pump, to initiate the polymerization. The time of the charge of the main aliquot (6.52 mmole) of the n-butyl lithium was used as the start time of the initial polymerization step. The initial polymerization step was characterized by a typical batch polymerization, without charge of any additional reactants. The reaction temperature was adjusted by heating or cooling via circulation of water in the wall of the reactors, beginning with the charge of the main aliquot of the n-butyl lithium, to a final polymerization temperature, $T_{pm}$, of 85° C., at a rate of 1° C./min to accelerate the polymerization reaction and shorten the reaction time.

After reacting the initial charge for 15 minutes, the first butadiene addition (162.27 g) began, using a feed rate of 8.1 g/min, for a charge time of 15 minutes. After this charge, no reaction time was allowed. The second butadiene addition (118.33 g) began immediately, using a feed rate of 5.9 g/min, for 20 minutes. Next, the third butadiene (57.43 g) addition began, using a feeding rate of 3.82 g/min. The reaction was then allowed to proceed for five minutes, after the butadiene charge was completed. Next, the fourth butadiene addition (15.72 g) began, followed by a reaction time of 12 minutes. Finally a fifth butadiene addition (5.25 g) began, using a feed rate of 5.1 g/min, and followed by a reaction time of 15 minutes.

During the reaction time of the fourth addition, tin tetrachloride (0.4349 mmole) was added to the reaction vessel to couple a portion of the polymer chains (25 percent of the chains as determined by SEC). During the reaction time of the fifth addition, 5.676 mmol n-methylpyrrolidone was added to the reaction vessel for modification of the polymer chain ends.

The final polymer suspension was cooled to ambient temperature. Methanol was added at a molar ratio of "methanol/active initiator I*" of "2 mole/mole," under stirring, to terminate the reaction. Next, an antioxidant was distributed into the polymer suspension, as solution in cyclohexane. The polymer was then recovered from the solution via steam stripping at 100° C. Then the polymer was milled to small crumbs, dried in an oven with air circulation at 70° C. for 30 minutes. Finally, the polymer crumbs were dried under ambient conditions, under air, until a content of residual volatiles reached below 0.5 percent, as determined by gravimetric analysis at 120° C.

Example 5

TT2310

Example 4 was repeated, with the change that no chain end modifying agent was used.

Example 6

TT2312

Example 4 was repeated, with the change that 3-methoxy-3,8,8-triethyl-2-oxa7-thia-3,8-disiladecane was used as the chain end modifying agent as example for a silica filler targeted modification.

Example 7

TT235M

Example 4 was repeated.

Example 8

TT238

Example 4 was repeated, with the change that 3-methoxy-3,8,8,9,9-pentamethyl-2-oxa-7-thia-3,8-disiladecane was used as the chain end modifying agent as example for a silica filler targeted modification.

Examples 9A, 9B, 9C, 9D, 9E and 9F

Example 4 was repeated.

Molecular weight, molecular weight distribution and coupling rate (CR) of the polymer were each measured using Size Exclusion Chromatography SEC based on polystyrene standards. The vinyl and styrene contents were measured using 1HNMR. The Mooney viscosity ML1+4(100° C.) was measured using MV2000 E from Alpha-Technologies. The glass transition temperature Tg was measured using a DSC 2920 from TA-Instruments.

The polymer properties are shown in Tables 1 and 2 below.

TABLE 1

Analytical Data of Polymers from Examples 1-4

| Trial | Mp g/mol | Mn g/mol | Mw g/mol | Mw/Mn | CR % | ML1 + 4 MU | Vinyl % | Styrene % | Tg ° C. |
|---|---|---|---|---|---|---|---|---|---|
| 1 | 248877 | 238415 | 386195 | 1.620 | 27.3 | 62.8 | 22.2 | 49.1 | −20.3 |
| 2 | 250375 | 228655 | 373480 | 1.633 | 25.18 | 59.5 | 32.4 | 49.7 | −13.1 |
| 3 | 246444 | 221367 | 362649 | 1.638 | 24.72 | 59.9 | 30.1 | 49.4 | −15.5 |
| 4 | 247521 | 252272 | 380904 | 1.510 | 25.96 | 63.8 | 9.8 | 48.3 | −28.8 |

TABLE 2

Analytical Data of Polymers from Examples 5-8 and 9A-9E

| Trial | Mp = MwTop g/mol | Mn g/mol | Mw g/mol | Mw/Mn | CR % | ML1 + 4 MU | Vinyl % | Styrene % | Tg ° C. |
|---|---|---|---|---|---|---|---|---|---|
| 5 | 276569 | 278733 | 430245 | 1.544 | 27.53 | 77.8 | 13.2 | 46.8 | −32.3 |
| 6 | 251389 | 264285 | 405040 | 1.533 | 31.27 | 73.6 | 12.6 | 49.3 | −26.5 |
| 7 | 249074 | 219926 | 388303 | 1.766 | 28.13 | 69.05 | 13 | 49.1 | −29.1 |
| 8 | 254858 | 263673 | 399055 | 1.513 | 27.47 | 72 | 13.2 | 46.8 | −30.7 |
| 9A | 241857 | 221761 | 383685 | 1.73 | 28.05 | 63.9 | 19.4 | 47.5 | −24.1 |
| 9B | 237484 | 216188 | 378815 | 1.752 | 27.8 | 61.6 | 15.8 | 48.9 | −24.4 |
| 9C | 245357 | 217868 | 379802 | 1.743 | 26.52 | 63.9 | 16.6 | 48 | −26.3 |
| 9D | 248911 | 220898 | 380993 | 1.725 | 26.04 | 65.8 | 14.7 | 48.4 | −27.1 |
| 9E | 248360 | 219764 | 383834 | 1.747 | 26.62 | 67.7 | 14.3 | 48.4 | −27.3 |

Figure 1:
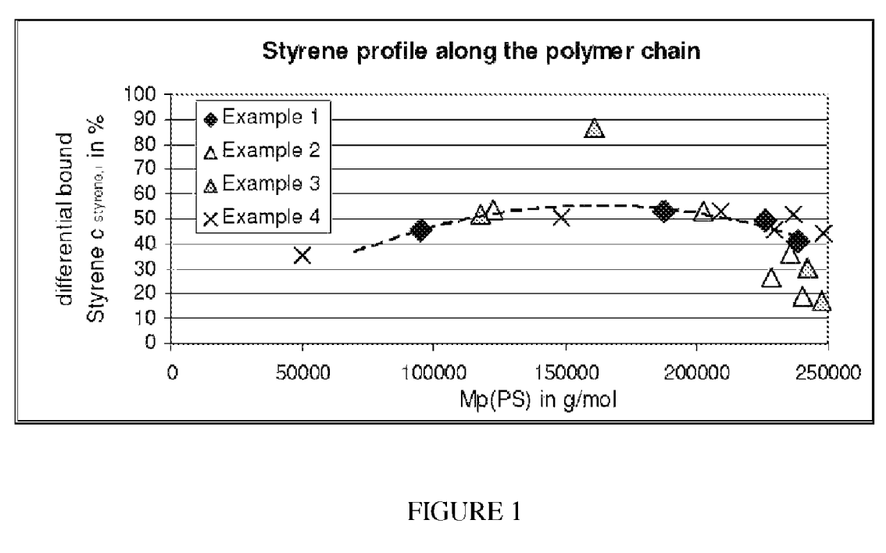
FIG. 1 depicts the differential styrene profile in several polymerization examples along the polymer chain. Mp=0 g/mol characterizes the alpha chain end of the polymer chain, Mp of about 250,000 g/mol is the molecular weight of the omega chain end of the polymer chain (Example 1, Example 2, Example 3 and Example 4).
Figure 2:
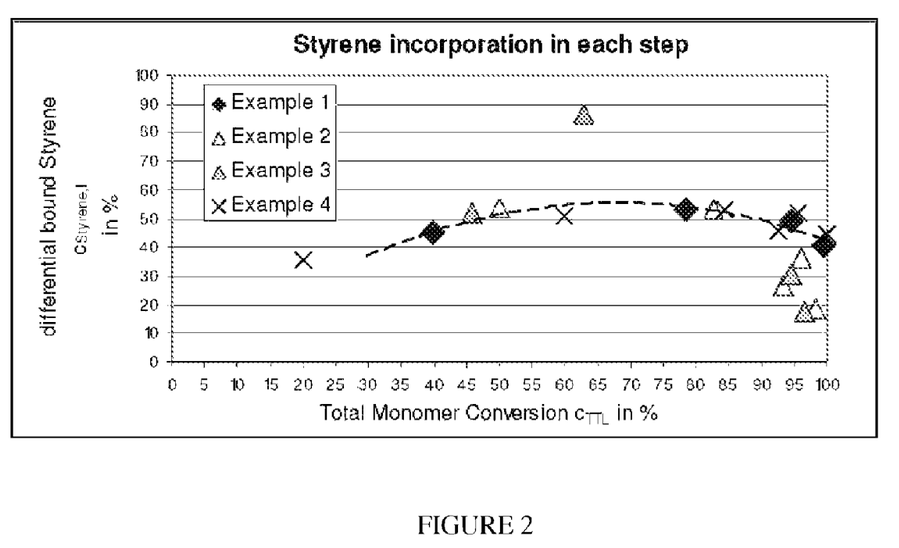
FIG. 2 depicts the differential styrene incorporation in the polymer chain, after each addition/polymerization step, for several polymerization examples (Example 1, Example 2, Example 3 and Example 4).

Differential styrene incorporation of each sample from Table 1 is shown in FIGS. 1 and 2, respectively. FIG. 1 depicts, as example, the differential styrene profile along the polymer chain. The "Mp=0 g/mol" characterizes the alpha chain end of the polymer chain, the "MP about 250 000 g/mol" is the molecular weight of the omega chain end of the polymer chain (see Example 1, Example 2, Example 3 and Example 4).

FIG. 2 depicts the differential styrene incorporation (mbound styrene, i) in the polymer chain, after each step, versus the total monomer conversion ($c_{TTL}$). The first point on the curve characterizes the differential bound styrene, after the first polymerization step, directly before addition of the first butadiene. The second point characterizes the differential styrene incorporation in the polymer chain, within the first butadiene addition step. The third point characterizes the differential styrene incorporation in the polymer chain, within the second butadiene addition step. The last point characterizes the differential styrene incorporation in the last addition steps.

Representative Calculation—Example 1

A sample of polymer solution was drawn from the reactor, directly before start of the first butadiene addition step. The current monomer conversion was determined to be $c_{current}$ 53.74 wt %, based on current charged monomer, corresponding to 406.5 g new formed polymer. This amount of "406.5 g" corresponds to a conversion referring to the finally charged total amount of monomers ($m_{monomer} = m_{st,0} + m_{Bd,0} + m_{Bd,1} + m_{Bd,2} + m_{Bd,3} + m_{Bd,4} = 1022.4$ g) called total conversion ($c_{TTL} = m_{polymer}/m_{monomer} * 100\%$ of 39.76%). The composition of the polymer was investigated by 1H-NMR, and found to consist of 45.3 wt %, based on the currently formed polymer, styrene, respectively 184.16 g bound styrene.

The next sample of polymer solution was drawn at the end of the first addition step. The current monomer conversion was determined to be $c_{current}$ 86.75 wt %, based on, until this point, time of charged monomer, corresponding to 802.7 g polymer, or 394.11 g newly formed polymer in this step. This amount of "802.7 g" corresponds to a conversion referring to the finally charged total amount of monomers $m_{monomer} = 1022.4$ g, also called the total conversion $c_{TTL} = m_{polymer}/m_{monomer} * 100\%$ of 78.51 wt %, (based on the total recipe amount of monomer). The composition of the polymer was investigated by 1H-NMR, and found to consist of 49.1 wt %, (based on totally formed polymer) styrene, or 394.11 g bound styrene. So in this first addition step, an amount of 209.95 g styrene (394.11 g minus 184.16 g) was newly incorporated in the "394.11 g newly formed polymer," corresponding to 53% (wt %, based on newly formed polymer during this addition step) styrene in this polymer chain piece.

A further sample of polymer solution was drawn at the end of the second addition step. The current monomer conversion was determined to be $c_{current}$ 95.58% (wt %, based on charged monomer at this point), corresponding to 967.4 g polymer, or 164.7 g newly formed polymer in this step. This amount of "967.4 g" corresponds to a conversion referring to the finally charged total amount of monomers ($m_{monomer} = m_{st,0} + m_{Bd,0} + m_{Bd,1} + m_{Bd,2} + m_{Bd,3} + m_{Bd,4} = 1022.4$ g), also called total conversion ($c_{TTL} = m_{polymer}/m_{monomer} * 100\%$ of 94.62% (wt %, based on totally to charge monomer)). The composition of the polymer was investigated by 1H-NMR, and found to consist of 49.1% (wt %, based on polymer) styrene, or 474.98 g bound styrene. So in this second addition step, an amount of 80.87 g styrene (474.98 g minus 384.11 g) was incorporated in the "164.7 g newly formed polymer," corresponding to 49.1% (wt %, based on newly formed polymer during this addition step) styrene in this polymer chain piece.

The final polymer solution sample was drawn at the end of the reaction. The current monomer conversion was determined to be ccurrent 99.46% (wt %, based on charged monomer), corresponding to 1016.8 g polymer or 49.4 g new formed polymer in this step. This amount of 1016.8 g corresponds to a conversion referring to the finally charged total amount of monomers ($m_{monomer}=m_{st,0}+m_{Bd,0}+m_{Bd,1}+m_{Bd,2}+m_{Bd,3}+m_{Bd,4}=1022.4$ g), also called total conversion ($c_{TTL}=m_{polymer}/m_{monomer}*100\%$ of 99.46% (wt %, based on totally to charge monomer)). The composition of the polymer was investigated by 1H-NMR, and found to consist of 48.7% (wt %, based on formed polymer) styrene, or 495.18 g bound styrene. So in these last addition steps, an amount of 20.21 g styrene (495.18 g minus 474.98 g) was incorporated in the "49.4 g" newly formed polymer, corresponding to 40.9% (wt %, based on newly formed polymer during this addition step) styrene in this polymer chain piece. The final molecular weight of the polymer was analyzed to $Mp_{(PS)}=238637$ g/mol.

The molecular weights of the polymer chain at the end of each polymerization step was calculated according to $M_{stepi}=c_{TTL, stepi}*Mp_{(PS)}$. The molecular weight of the polymer chain at the end is calculated as follows.

of the first polymerization step as $M_{step0}=39.76\%/100\%*238637$ g/mol=94891 g/mol, of the first butadiene addition step is calculated as $M_{step1}=78.51\%/100\%*238637$ g/mol=187356 g/mol, of the second butadiene addition step is calculated as $M_{step2}=94.62\%/100\%*238637$ g/mol=225798 g/mol.

FIG. 1 depicts the differential styrene incorporation, per step, versus the molecular weight $M_{(PS)}$ of the polymer chain.

FIG. 2 depicts the differential styrene incorporation, per step, versus the total conversion $c_{TTL}$. The profiles in FIGS. 1 and 2 are each plotted from the data in Table 3, derived from the above analysis.

Sample Formulations

Polymer formulations were prepared by combining and compounding the constituents listed below, in Tables 4 and 5, in a "380 cc Banbury mixer." Formulations were vulcanized at 160° C., 160-220 bar, ambient atmosphere (air). For tensile properties, the formulation was vulcanized at 160° C. for t95 minutes (t95 acc to ASTM D 5289-07 as the time needed to cure to 95% "vulcanization conversion," and t95 ranges from about 10 to 22 minutes). For all other properties, the formulation was vulcanized at 160° C. for t95+5 minutes. All amounts were based on phr rubber (here, rubber=amount styrene-butadiene copolymer plus, if present, the amount polybutadiene, both components=100 weight units). As known in the art, "phr" refers to "parts per hundred rubber."

TABLE 4

| Formulation 1 - Silica Filled Formulation | |
|---|---|
| | Amount (phr) |
| Compounding -First Stage | |
| Elastomeric polymer sample (styrene butadiene copolymer) | 80 |
| High cis-1,4-polybutadiene (Buna cis 132 - Schkopau, Dow Europe) | 20 |
| Precipitated silica (Ultrasil 7000 GR, Degussa-Hüls AG) | 80 |
| Silane (NXT silane, General Electric Company) | 9.7 |
| Stearic acid | 1.0 |
| Antiozonant (Dusantox 6 PPD (N-(1,3-dimethyl-butyl)-N'-phenyl-pphenylendiamine) (Duslo) | 2.0 |
| Zinc oxide | 2.5 |
| Ozone protecting wax (Anitlux 654, Rhein Chemie Rheinau GmbH) | 1.5 |
| Extender oil (Tudalen 65, Klaus Dahleke KG) | 20 |
| Second Stage | |
| Sulfur | 1.4 |
| CBS (N-cyclohexyl-2-benzothiazylsulfenamid; Vulcacit CZ/EG, Lanxess AG | 1.5 |
| DPG (diphenylguanidine, Vulkacit D, Lanxess AG) | 1.5 |

TABLE 3

| | | Charged amounts | | | | Determination of conversion | | | |
|---|---|---|---|---|---|---|---|---|---|
| Step | i | M Cyclohexane (g) | mSt, (g) | mBd, i (g) | M Monomer, charged (g) | TSCmax in % from recipe | TSC in %, measured | ccurrent (%) | cTTL in % |
| | 0 | 5023.79 | 510.92 | 245.51 | 756.43 | 13.09 | 7.03 | 53.74 | 39.76 |
| Addition Butadiene 1 | 1 | 5023.79 | 0 | 168.83 | 925.26 | 15.55 | 13.49 | 86.75 | 78.51 |
| Addition Butadiene 2 | 2 | 5023.79 | 0 | 86.81 | 1012.07 | 16.77 | 16.03 | 95.58 | 94.62 |
| End of Polymerization | 4 | 5131.47 | 0 | 10.30 | 1022.37 | 16.61 | 16.52 | 99.46 | 99.46 |

| | | Total values | | | | Differential change in | | |
|---|---|---|---|---|---|---|---|---|
| Step | i | M Polymer (g) | cStyrene, i in % | M bound styrene (g) | M(PS) in g/mol | the step i mPolymer, i (g) | mbound styrene, i (g) | cStyrene, i in % |
| | 0 | 406.53 | 45.3 | 184.16 | 94891 | 406.53 | 184.16 | 45.30 |
| Addition Butadiene 1 | 1 | 802.67 | 49.1 | 394.11 | 187356 | 396.14 | 209.95 | 53.00 |
| Addition Butadiene 2 | 2 | 967.37 | 49.1 | 474.98 | 225798 | 164.70 | 80.87 | 49.10 |
| End of Polymerization | 4 | 1016.80 | 48.7 | 495.18 | 238637 | 49.43 | 20.20 | 40.87 |

TABLE 5

Formulation 2 - Carbon Black Filled Formulation

| | Amount (phr) |
|---|---|
| Compounding - First Stage | |
| Elastomeric polymer sample (styrene butadiene copolymer) | 100 |
| IRB 7 (international reference carbon black, Sid Richardson) | 50 |
| Stearic acid | 1.5 |
| Zinc oxide | 3.0 |
| Extender oil (Tudalen 65, Klaus Dahleke KG) | 5.0 |
| 2nd Stage | |
| Sulfur | 1.75 |
| CBS (N-cyclohexyl-2-benzothiazylsulfenamid; Vulcacit CZ/EG, Lanxess AG) | 1.0 |

Properties of the silica-filled formulations are shown in Tables 6 and 7 below. The results from two comparisons (UE23-A1 and TG-06-B1) are also shown.

Properties of the carbon black-filled formulations are shown in Tables 8A, 8B and 9 below. The results from two comparisons (SE SLR-4601 (UE23-A1) and SE SLR-4400 (TG06-B 1) are also shown.

As shown in Tables 6 and 7, the inventive formulations show a better tear resistance (ASTM D624-00 (tear strength), tensile strength), better wet grip to performance (lower rebound resilience at 0° C. and/or higher tan delta at 0° C.; tests used to indicate superior wet grip behavior of the tire), better abrasion resistance (DINabrasion), all properties at a similar rolling resistance (rebound resilience at 60° C. and/or tan delta at 60° C.; tests used to indicate rolling resistance of the tire), all properties as compared to the commercial, comparison rubbers in a silica filled standard compound.

As shown in Tables 8A, 8B and 9, the inventive formulations show an better tensile performance (tensile strength), wet grip performance (higher tan delta at 0° C.), and better abrasion resistance (DIN-abrasion), all properties at a similar rolling resistance (rebound at 60° C., tan delta at 60° C., and/or Heat Build-Up (HBU); tests used to indicate rolling resistance of the tire), all properties as compared to the commercial, comparison rubbers in a carbon black filled standard compound.

TABLE 6

Properties of the Silica Filled Formulations (Formulation 1)

| | Dim. | Polymer | | | | | | |
|---|---|---|---|---|---|---|---|---|
| | | UE23A1 | UE23A1 | TG-06B1 | 5 | 6 | 7 | 8 |
| Compound Mooney | MU | 52.3 | 47.9 | 39.4 | 55.4 | 66.5 | 64.2 | 65.9 |
| Cure@160° C./; dumbbell size Die C | | 23' | 21' | 18' | 18' | 18' | 18' | 14' |
| Tensile strength | MPa | 16.0 | 19.8 | 19.4 | 21.5 | 24.0 | 19.6 | 24.4 |
| Elongation @ break | % | 473 | 525 | 668 | 665 | 639 | 575 | 606 |
| Modulus 100 | MPa | 2.5 | 2.3 | 2.1 | 2.3 | 2.0 | 2.4 | 2.1 |
| Modulus 300 | MPa | 8.5 | 9.1 | 7.1 | 7.6 | 9.3 | 8.7 | 9.5 |
| Mod. 300 – Mod. 100 | MPa | 6.0 | 6.8 | 5.0 | 5.4 | 7.2 | 6.3 | 7.4 |
| Cure@160° C./; Graves test | | | | | | | | |
| Tear strength with grain | Nmm | 28.7 | 51.4 | 26.5 | 84.9 | 104.8 | 57.0 | 107.0 |
| Tear strength across grain | Nmm | 29.0 | 47.9 | 29.5 | 45.8 | 72.1 | 58.5 | 75.5 |
| Average Tear strength | | 28.9 | 49.6 | 28.0 | 65.3 | 88.4 | 57.8 | 91.3 |
| Cure@160° C./; 12.5 mm plate | | 28' | 26' | 23' | 23' | 23' | 23' | 19' |
| Rebound resilience @0° C. | % | 21.8 | 9.8 | 23.0 | 7.4 | 6.0 | 5.4 | 5.8 |
| Rebound resilience @23° C. | % | 38.0 | 37.6 | 46.0 | 31.8 | 27.4 | 27.8 | 31.8 |
| Rebound resilience @60° C. | % | 55.2 | 57.8 | 54.4 | 54.0 | 52.6 | 55.4 | 57.0 |
| Rebound resilience 60° C. – 0° C. | % | 33.4 | 48.0 | 31.4 | 46.6 | 46.6 | 50.0 | 51.2 |
| Hardness Shore A @0° C. | | 69.5 | 69.3 | 67.5 | 67.9 | 67.9 | 64.3 | 63.7 |
| Hardness Shore A @23° C. | | 65.1 | 63.7 | 63.1 | 64.1 | 63.9 | 60.9 | 59.9 |
| Hardness Shore A @60° C. | | 62.3 | 60.1 | 59.1 | 61.5 | 60.0 | 60.1 | 58.7 |
| Hardness Shore A Diff 0 – 60 C. | | 7.2 | 9.2 | 8.4 | 6.4 | 7.0 | 4.2 | 5.0 |
| Cure@160° C./; 10 mm plate | | 23' | 21' | 18' | 18' | 18' | 18' | 14' |
| DIN abrasion, 0.5 kg load | mm | 121 | 112 | 94 | 97 | 91 | 93 | 91 |

TG01-B1 commercial SSBR SE SLR-4400 from Dow Chemical, 25% Styrene, 35% Vinyl, ML1 + 4 (100° C.): 55, Tg: −50 C.
UE23-A1 commercial SSBR SE SLR-4601 from Dow chemical: 21% styrene, 63% vinyl, ML1 + 4 (100° C.): 50, chain end modified for Carbon Black as filler

TABLE 7

Properties of the Silica Filled Formulations (Formulation 1)

| Cure @160° C./; (25.4 × 17.8) mm cylinder | Dim. | Polymer | | | | | | |
|---|---|---|---|---|---|---|---|---|
| | | UE23A1 | UE23A1 | TG-06B1 | 5 | 6 | 7 | 8 |
| HBU sample | ° C. | 122 | 112.8 | 151.2 | 135.9 | 112.4 | 128.3 | 106.2 |
| Holder | ° C. | 48.1 | 43.8 | 60.0 | 53.1 | 43.4 | 49.3 | 41.9 |
| Cure @160° C./; 10 mm plate; DMTS | | 23' | 21' | 18' | 18' | 18' | 18' | 14' |
| E'@0° C. | Pa | 22.0657 | 19.1456 | 22.0268 | 23.9628 | 19.7255 | 24.6892 | 17.1294 |
| E'@60° C. | Pa | 9.9885 | 9.1311 | 10.7374 | 11.3974 | 8.1117 | 10.3124 | 7.8465 |
| E"@0° C. | Pa | 5.7249 | 5.1815 | 4.5731 | 8.2555 | 9.5516 | 10.6785 | 6.8946 |
| E"@60° C. | Pa | 1.5739 | 1.3885 | 1.9918 | 1.9227 | 1.1092 | 1.6655 | 1.0227 |
| tan δ @−10° C. | | 0.4025 | 0.4451 | 0.2498 | 0.6021 | 0.8798 | 0.7873 | 0.7283 |
| tan δ @0° C. | | 0.2594 | 0.2706 | 0.2076 | 0.3445 | 0.4842 | 0.4325 | 0.4025 |
| (tan δ @−10° C.) (tan δ @0° C.) | | 0.1431 | 0.1744 | 0.0422 | 0.2576 | 0.3956 | 0.3547 | 0.3258 |
| tan δ @60° C. | | 0.1576 | 0.1521 | 0.1855 | 0.1687 | 0.1367 | 0.1615 | 0.1303 |
| tan δ max | | 0.6879 | 0.7539 | 0.6116 | 0.8221 | 1.0053 | 0.9132 | 0.9447 |
| T @ tan δ max | ° C. | −22 | −22 | −38 | −16 | −14 | −14 | −16 |

(Tabelle GP2-01-01 Zusammenfassung/TH091)

TG01-B1 commercial SSBR SE SLR-4400 from The Dow Chemical Company: 25% Styrene, 35%

Vinyl, ML1 + 4 (100 C.): 55, Tg: −50° C. UE23-A1 commercial SSBR SE SLR-4601 from The Dow Chemical Company: 21% styrene, 63% vinyl, ML1 + 4 (100 C.): 50, Tg: −25° C., chain end functionalized for CB

TABLE 8A

Properties of the Carbon Black Filled Formulations (Formulation 2)

| | | Polymer | | | | | | |
|---|---|---|---|---|---|---|---|---|
| | | SE SLR4601 UE23A1 | 9A | 9B | 9C | SE SLR4400 TG06-B1 | 9D | 9E |
| Cure @160° C./20'; dumbbell size Die C | | | | | | | | |
| Tensile strength | MPa | 22.0 | 24.3 | 26.4 | 26.2 | 20.9 | 29.4 | 28.3 |
| Modulus 100 | MPa | 2.4 | 3.2 | 3.1 | 3.0 | 2.5 | 2.8 | 2.9 |
| Modulus 300 | MPa | 14.7 | 19.6 | 18.9 | 19.3 | 13.0 | 17.9 | 18.5 |
| Cure @160° C./25'; 12.5 mm plate | | | | | | | | |
| Rebound resilience @ 0° C. | % | 5.4 | 11.2 | 10.6 | 9.0 | 19.0 | 8.2 | 11.0 |
| Rebound resilience @ 23° C. | % | 24.2 | 18.4 | 18.4 | 19.4 | 51.2 | 20.8 | 21.2 |
| Rebound resilience @ 60° C. | % | 61.4 | 59.8 | 59.4 | 59.4 | 63.4 | 60.4 | 60.8 |
| Rebound resilience @ 70° C. | % | | | | | | | |
| Hardness Shore A @ 0° C. | | 66.3 | 72.9 | 73.1 | 72.1 | 65.1 | 70.3 | 72.5 |
| Hardness Shore A @ 23° C. | | 61.5 | 65.5 | 65.1 | 64.9 | 62.7 | 64.3 | 64.5 |
| Hardness Shore A @ 60° C. | | 59.1 | 63.5 | 63.5 | 63.3 | 61.3 | 61.9 | 62.7 |

TABLE 8B

Properties of the Carbon Black Filled Formulations (Formulation 2)

| | | Polymer | | | | | | | |
|---|---|---|---|---|---|---|---|---|---|
| Cure @ 160° C./25'; plate | | SE SLR4601 UE23A1 10 mm | SE SLR4601 UE23-A1 8 mm | 9A 10 mm | 9A 8 mm | 9B 10 mm | 9B 8 mm | 9C 10 mm | 9C 8 mm |
| DIN abrasion, 10N load | mm3. | 144 | 131 | 128 | 112 | 120 | 116 | 123 | 119 |
| Cure @ 160° C./25'; (25.4 × 17.8) mm cylinder | | Ave | s | Ave | s | Ave | s | Ave | s |
| HBU sample (° C.) | | 79.1 | 1.2 | 78.8 | 1.1 | 78.1 | 1.2 | 78.3 | 0.7 |
| HBU holder | ° C. | 33.8 | 0.2 | 34.9 | 0.6 | 34.9 | 0.4 | 33.8 | 0.2 |

TABLE 8B-continued

Properties of the Carbon Black Filled Formulations (Formulation 2)

|  |  | Polymer | | | | | |
| --- | --- | --- | --- | --- | --- | --- | --- |
| Cure @ 160° C./25'; plate |  | SE SLR4400 TG06-B1 10 mm | SE SLR4400 TG06 B1 8 mm | 9D 10 mm | 9D 8 mm | 9E 10 mm | 9E 8 mm |
| DIN abrasion, 10N load | mm3. | 126 | 116 | 124 | 109 | 120 | 112 |
| Cure @ 160° C./25'; (25.4 × 17.8) mm cylinder |  | Ave | s | Ave | s |  | s |
| HBU sample (° C.) |  | 92.7 | 0.6 | 79.2 | 1.5 | 79.4 | 0.7 |
| HBU holder | ° C. | 40.1 | 0.2 | 34.5 | 0.2 | 34.6 | 0.4 |

TABLE 9

Properties of the Carbon Black Filled Formulations (Formulation 2)

| Cure@160° C./25'; 10 mm plate; DMTS: temp. | SE SLR-4601 UE23-A1 | 9A | 9B | 9C | 9D | 9E |
| --- | --- | --- | --- | --- | --- | --- |
| E'@ −25° C. | 1710.75 | 1492.2 | 1463.86 | 1545.29 | 1472.89 | 1362.02 |
| E'@ 0° C. | 17.78 | 35.62 | 35.34 | 32.10 | 28.58 | 27.28 |
| E'@ 60° C. | 5.93 | 6.84 | 6.81 | 6.88 | 6.80 | 6.60 |
| E"@ −25° C. | 75.87 | 56.16 | 48.68 | 67.69 | 81.75 | 66.59 |
| E"@ 0° C. | 13.06 | 37.43 | 36.54 | 30.33 | 25.29 | 24.37 |
| E"@ 60° C. | 0.4882 | 0.5219 | 0.52 | 0.5019 | 0.48 | 0.4373 |
| tan d @ −10° C. | 1.3349 | 0.6995 | 0.7392 | 0.8623 | 0.9417 | 0.9339 |
| tan d @ 0° C. | 0.7347 | 1.0509 | 1.0341 | 0.9448 | 0.8849 | 0.8934 |
| (tan d @ −10° C.) − (tan d @ 0° C.) | 0.6002 | −0.3514 | −0.2949 | −0.0825 | 0.0568 | 0.0406 |
| tan d @ 60° C. | 0.0823 | 0.0763 | 0.0763 | 0.0730 | 0.0707 | 0.0663 |

The invention claimed is:

1. A process for polymerizing a polymer comprising monomeric units derived from styrene and 1,3-butadiene, said process comprising:
   A) adding less than 60 weight percent of the total amount of the butadiene used in the polymerization, to a reactor comprising the total amount of styrene used in the polymerization, and solvent;
   B) adding at least one initiator to the reactor, and allowing the reaction to proceed for a time t;
   C) adding the remaining amount of butadiene to the reactor in two or more separate additions; and
   wherein for each butadiene addition, the amount of subsequent butadiene added, is less than, or equal to, the amount of butadiene added in the immediately prior addition; and
   wherein for each butadiene addition, the butadiene is added over a time, $t_{nc}$, and after each addition, the reaction is allowed to proceed for a time, $t_{nr}$, wherein n is the number of the butadiene addition, and for each addition, n is independently greater than or equal to 1.

2. The process of claim 1, wherein, in Step B, the time, t, ranges from 1 minute to 30 minutes.

3. The process of claim 1, wherein $t_{nc}$ for each addition independently ranges from 1 minute to 45 minutes.

4. The process of claim 1, wherein $t_{nr}$, for each addition, independently ranges from 0 to 45 minutes.

5. The process of claim 1, wherein, in step C), the remaining amount of the butadiene is added in three separate additions.

6. The process of claim 1, wherein a vinyl agent is added to the process.

7. The process of claim 6, wherein the vinyl agent is tetramethylethylene diamine (TMEDA).

8. The process of claim 1, wherein $t_{(n-1)r}$ is greater than one minute; n is greater than or equal to 2; and wherein during the time $t_{(n-1)r}$, a coupling agent is added to the reactor.

9. The process of claim 8, wherein the coupling agent is selected from the group consisting of tin tetrachloride, silicon tetrachloride and a silicon alkoxide.

10. The process of claim 1, wherein $t_{nr}$ is greater than one minute; n is greater than, or equal to 3; and wherein during the time $t_{nr}$, a modifying agent is added to the reactor.

11. The process of claim 10, wherein the modifying agent is selected from the group consisting of amines, amides, thioglycols, silicon alkoxides, and silane-sulfide modifiers.

12. A polymer formed by the process of claim 1.

13. The polymer of claim 12, wherein the polymer has a polymerized styrene content from 42 to 62 weight percent, based on the total weight of polymerized monomers.

14. The polymer of claim 12, wherein the polymer has a polymerized 1,2-butadiene content from 3 to 50 weight percent, based on the total weight of polymerized butadiene.

15. A composition comprising the polymer of claim 12.

16. A composition comprising a polymer, said polymer comprising monomeric units derived from styrene and 1,3-butadiene, and comprising uncoupled polymer chains;
   wherein each uncoupled polymer chain has a styrene content that is higher in a middle region of the polymer chain and lower at end regions of the polymer chain; and
   wherein a difference in styrene content in the middle region of the polymer chain and at both end regions of the polymer chain is greater than 1 mole percent, based on the total moles of polymerized styrene in the polymer chain.

17. The composition of claim 16, wherein from 10 to 49 percent based on the mass of final polymer in weight percent of the polymer is coupled.

18. An article comprising at least one component formed from the composition of claim 15.

* * * * *